(12) United States Patent
Van Wiemeersch et al.

(10) Patent No.: US 9,472,963 B2
(45) Date of Patent: Oct. 18, 2016

(54) DEVICE FOR WIRELESS CHARGING HAVING A PLURALITY OF WIRELESS CHARGING PROTOCOLS

(71) Applicant: Ford Global Technologies, LLC, Dearborn, MI (US)

(72) Inventors: John Robert Van Wiemeersch, Novi, MI (US); Michael Hrecznyj, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 778 days.

(21) Appl. No.: 13/760,514

(22) Filed: Feb. 6, 2013

(65) Prior Publication Data

US 2014/0217965 A1 Aug. 7, 2014

(51) Int. Cl.
*H02J 7/00* (2006.01)
*H04B 5/00* (2006.01)
*H02J 7/02* (2016.01)

(52) U.S. Cl.
CPC .............. *H02J 7/0042* (2013.01); *H02J 7/025* (2013.01); *H04B 5/0037* (2013.01); *H04B 5/0075* (2013.01)

(58) Field of Classification Search
CPC .... H02J 7/0042; H02J 7/025; H04B 5/0037; H04B 5/0075
USPC .......................................... 716/108; 320/108
See application file for complete search history.

(56) References Cited

U.S. PATENT DOCUMENTS

| | | |
|---|---|---|
| 3,938,018 A | 2/1976 | Dahl |
| 5,952,814 A | 9/1999 | Van Lerberghe |
| 6,075,340 A | 6/2000 | Koenck |
| 6,235,420 B1 | 5/2001 | Ng |
| 6,419,379 B1 | 7/2002 | Hulse |
| 7,434,953 B2 | 10/2008 | Newton et al. |
| 7,518,337 B2 | 4/2009 | Beart et al. |
| 7,629,769 B2* | 12/2009 | Gangstoe .............. H02J 7/0031 320/112 |
| 7,633,263 B2 | 12/2009 | Toya |
| 7,772,802 B2 | 8/2010 | Manico et al. |
| 7,808,205 B2 | 10/2010 | Rao et al. |
| 7,889,498 B2 | 2/2011 | Diebel et al. |
| 7,932,638 B2 | 4/2011 | Randall |
| 7,952,322 B2 | 5/2011 | Partovi et al. |
| 8,102,147 B2 | 1/2012 | Jung |
| 8,103,266 B2 | 1/2012 | Fok et al. |
| 8,120,311 B2 | 2/2012 | Baarman et al. |

(Continued)

OTHER PUBLICATIONS

"Qi Compliant Wireless Power Transmitter Manager," bq500210, Texas Instruments, ww.ti.com, 25 pages, Jun. 2011—revised Aug. 2011, Copyright 2011, Texas Instruments Incorporated.

(Continued)

*Primary Examiner* — Jack Chiang
*Assistant Examiner* — Brandon Bowers
(74) *Attorney, Agent, or Firm* — Vichit Chea; Price Heneveld LLP

(57) ABSTRACT

A receiver device configured to connect to a chargeable device, including an inductive region including at least one receiver coil for receiving magnetic flux from an inductive charging system. Additionally the receiver device includes a conductive region having contacts for receiving wireless electric power from a conductive charging system. In addition, the receiver device includes a connector for transferring wireless power received from the inductive or conductive charging system to the chargeable device in order to charge the chargeable device.

20 Claims, 9 Drawing Sheets

(56) References Cited

U.S. PATENT DOCUMENTS

| | | |
|---|---|---|
| 8,169,185 B2 | 5/2012 | Partovi et al. |
| 8,242,741 B2 | 8/2012 | Phelps, III |
| 8,373,310 B2 | 2/2013 | Baarman et al. |
| 8,410,751 B2 | 4/2013 | Terao et al. |
| 8,421,278 B2 | 4/2013 | Yamamoto et al. |
| 8,645,481 B2 | 2/2014 | Eaton |
| 8,903,456 B2 | 12/2014 | Chu et al. |
| 9,059,591 B2 | 6/2015 | Niec et al. |
| 2003/0019931 A1 | 1/2003 | Tsikos et al. |
| 2003/0036805 A1 | 2/2003 | Senior |
| 2005/0127867 A1 | 6/2005 | Calhoon et al. |
| 2005/0131486 A1 | 6/2005 | Boveja et al. |
| 2007/0293277 A1 | 12/2007 | Bury |
| 2009/0051312 A1 | 2/2009 | Simon et al. |
| 2009/0072782 A1* | 3/2009 | Randall ............... G06F 1/1616 320/107 |
| 2009/0096413 A1* | 4/2009 | Partovi ................ H01F 5/003 320/108 |
| 2009/0146608 A1 | 6/2009 | Lee |
| 2009/0278494 A1* | 11/2009 | Randall ............... H02J 7/0044 320/114 |
| 2010/0114241 A1 | 5/2010 | Donofrio et al. |
| 2010/0181961 A1 | 7/2010 | Novak et al. |
| 2010/0207575 A1 | 8/2010 | Pijnenburg et al. |
| 2010/0253281 A1 | 10/2010 | Li |
| 2010/0289448 A1 | 11/2010 | Jung et al. |
| 2011/0018679 A1 | 1/2011 | Davis et al. |
| 2011/0050164 A1 | 3/2011 | Partovi et al. |
| 2011/0291613 A1 | 12/2011 | Rosik et al. |
| 2012/0104997 A1 | 5/2012 | Carobolante |
| 2012/0117730 A1 | 5/2012 | Lemire et al. |
| 2012/0206098 A1 | 8/2012 | Kim |
| 2012/0233062 A1* | 9/2012 | Cornish .............. B25J 11/00 705/39 |
| 2012/0235636 A1 | 9/2012 | Partovi |
| 2012/0299538 A1 | 11/2012 | Arai et al. |
| 2013/0020988 A1 | 1/2013 | Kim et al. |
| 2013/0049662 A1 | 2/2013 | Keong et al. |
| 2013/0058023 A1* | 3/2013 | Supran ............... G06F 1/1632 361/679.01 |
| 2013/0076308 A1 | 3/2013 | Niskala et al. |
| 2013/0093390 A1 | 4/2013 | Partovi |
| 2013/0096651 A1 | 4/2013 | Ozawa et al. |
| 2013/0113421 A1 | 5/2013 | Han et al. |
| 2013/0147426 A1 | 6/2013 | Misono |
| 2013/0257363 A1 | 10/2013 | Lota et al. |
| 2013/0285602 A1* | 10/2013 | Nergaard ........... B60L 11/1816 320/108 |
| 2013/0300204 A1 | 11/2013 | Partovi |
| 2014/0103865 A1 | 4/2014 | Van Wiemeersch et al. |
| 2014/0125277 A1 | 5/2014 | Van Wiemeersch et al. |
| 2014/0129054 A1 | 5/2014 | Huntzicker et al. |
| 2014/0176057 A1 | 6/2014 | Van Wiemeersch |
| 2014/0191568 A1 | 7/2014 | Partovi |
| 2014/0203770 A1 | 7/2014 | Salter et al. |
| 2014/0239891 A1 | 8/2014 | Martin et al. |

OTHER PUBLICATIONS

Davis, Sam, editor-in-chief, PET, "Wireless Power Receiver IC Complements Existing Transmitter," Power Electronics Technology, www.powerelectronics.com, pp. 15-17, Jul. 2011.

Ngo, Dong, "CES: Universal Wireless Charging ElectroHub to Demo at CES 2011," www.cnet.com, 7 pages, Dec. 1, 2010.

\* cited by examiner

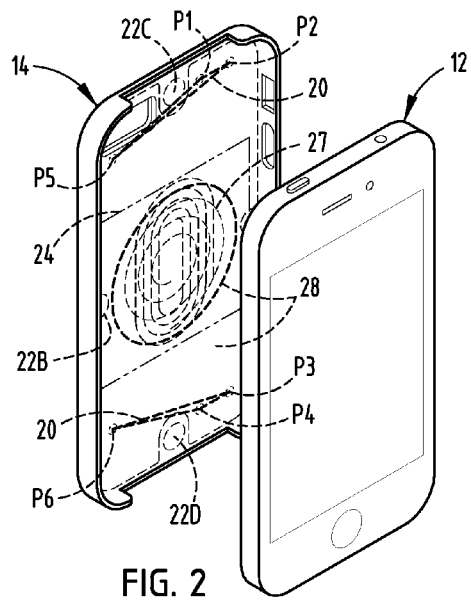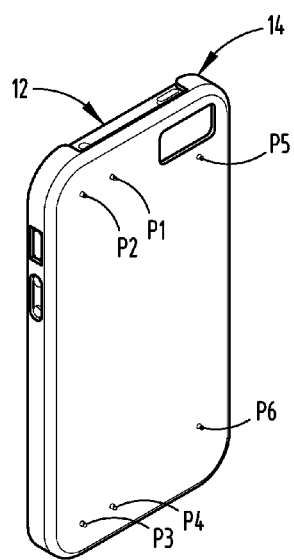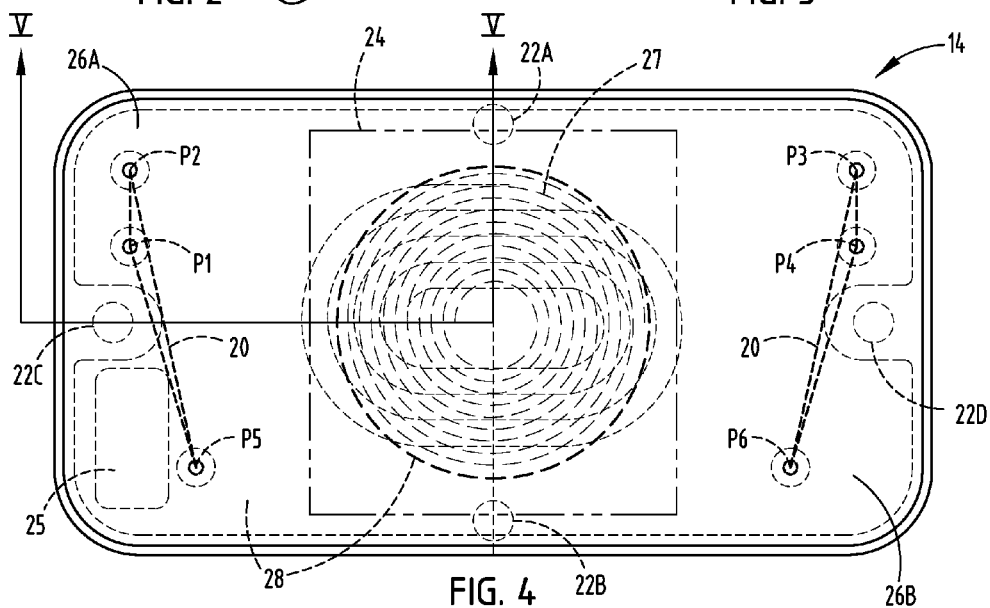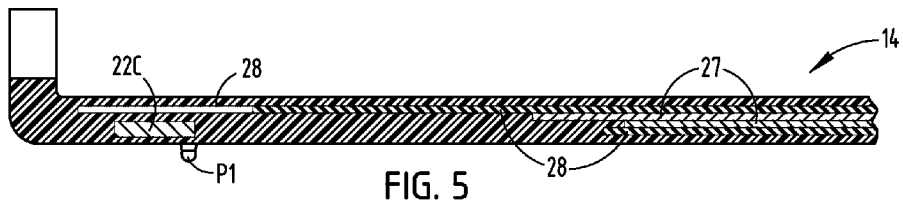

| P1 | P2 | P3 | P4 | P5 | P6 | EXAMPLE SCHEMATIC |
|---|---|---|---|---|---|---|
| 0 | 0 | 0 | 0 | 0 | Zv | NOT POSSIBLE OR NO POWER |
| 0 | 0 | 0 | Zv | 0 | Zv | WW |
| 0 | 0 | Zv | 0 | 0 | Zv | |
| 0 | 0 | Zv | Zv | 0 | Zv | |
| 0 | Zv | 0 | 0 | 0 | Zv | |
| 0 | Zv | 0 | Zv | 0 | Zv | |
| 0 | Zv | Zv | 0 | 0 | Zv | XX |
| 0 | Zv | Zv | Zv | 0 | Zv | YY |
| Zv | 0 | 0 | 0 | 0 | Zv | |
| Zv | 0 | 0 | Zv | 0 | Zv | |
| Zv | 0 | Zv | 0 | 0 | Zv | |
| Zv | 0 | Zv | Zv | 0 | Zv | |
| Zv | Zv | 0 | 0 | 0 | Zv | |
| Zv | Zv | 0 | Zv | 0 | Zv | |
| Zv | Zv | Zv | 0 | 0 | Zv | |
| Zv | Zv | Zv | Zv | 0 | Zv | NOT POSSIBLE |
| 0 | 0 | 0 | 0 | Zv | Zv | |
| 0 | 0 | 0 | Zv | Zv | Zv | |
| 0 | 0 | Zv | 0 | Zv | Zv | |
| 0 | 0 | Zv | Zv | Zv | Zv | |
| 0 | Zv | 0 | 0 | Zv | Zv | |
| 0 | Zv | 0 | Zv | Zv | Zv | |
| 0 | Zv | Zv | 0 | Zv | Zv | |
| 0 | Zv | Zv | Zv | Zv | Zv | |
| Zv | 0 | 0 | 0 | Zv | Zv | |
| Zv | 0 | 0 | Zv | Zv | Zv | ZZ |
| Zv | 0 | Zv | 0 | Zv | Zv | |
| Zv | 0 | Zv | Zv | Zv | Zv | |
| Zv | Zv | 0 | 0 | Zv | Zv | |
| Zv | Zv | 0 | Zv | Zv | Zv | |
| Zv | Zv | Zv | 0 | Zv | Zv | |
| Zv | Zv | Zv | Zv | Zv | Zv | NOT POSSIBLE |

FIG. 8

| INPUT STATE | | | | NEXT RESULTING LOGIC FOR INPUT STATE | | | | COMMENTS |
|---|---|---|---|---|---|---|---|---|
| $V_E$ | $V_{IC}$ | $V_{CC}$ | $V_{BD}$ | STATUS OF DIS IC LINE | STATUS OF DIS $X_V$ LINE | STATUS OF SC-DIS $X_V$ LINE | STATUS OF REGULATOR OUTPUT | |
| 0 | 0 | 0 | 0 | — | — | — | | NO POWER |
| 0 | 0 | $Y_V$ | .7 | DON'T CARE | ENABLED | DISABLED | REGULATOR INHIBITED (OFF) | OPEN REGULATOR DUE TO SHORTED BATTERY TERMINALS |
| 0 | 0 | $Y_V$ | $T_V$ | DON'T CARE | ENABLED | ENABLED | REGULATOR ON | IF DIODE DF1 OPEN CIRCUIT (CIRCUIT FAULT) THEN $V_{BD}$ IS $T_V$ AND $V_E$ IS 0 |
| 0 | $V_{IC}+$ | 0 | .7 | DON'T CARE | ENABLED | DISABLED | REGULATOR INHIBITED (OFF) | OPEN REGULATOR DUE TO SHORTED BATTERY TERMINALS |
| 0 | $V_{IC}+$ | 0 | $T_V$ | DON'T CARE | ENABLED | ENABLED | REGULATOR ON | IF DIODE DF1 OPEN CIRCUIT (CIRCUIT FAULT) THEN $V_{BD}$ IS $T_V$ AND $V_E$ IS 0 |
| 0 | $V_{IC}+$ | $Y_V$ | .7 | DISALLOW $V_{IC}$ POWER OUT | ENABLED | DISABLED | REGULATOR INHIBITED (OFF) | OPEN REGULATOR DUE TO SHORTED BATTERY TERMINALS. SHUT DOWN IC POWER SINCE CONDUCTIVE POWER IS AVAILABLE |
| 0 | $V_{IC}+$ | $Y_V$ | $T_V$ | DISALLOW $V_{IC}$ POWER OUT | ENABLED | ENABLED | REGULATOR ON | IF DIODE DF1 OPEN CIRCUIT (CIRCUIT FAULT) THEN $V_{BD}$ IS $T_V$ AND $V_E$ IS 0 SHUT DOW IC POWER SINCE CONDUCTIVE POWER AVAILABLE |
| $X_V$ | 0 | 0 | .7 | — | — | — | — | EXTERNAL $X_V$ USB POWER APPLIED SWITCH MODE REGULATOR INACTIVE |
| $X_V$ | 0 | $Y_V$ | $T_V$ | DISALLOW $V_{IC}$ POWER OUT | ENABLED | ENABLED | REGULATOR ON | NORMAL CONDUCTIVE CHARGE STATE $X_V$ OR EXTERNAL $X_V$ USB POWER APPLIED SHUT DOWN IC POWER SINCE CONDUCTIVE POWER AVAILABLE |
| $X_V$ | $V_{IC}+$ | 0 | $T_V$ | ENABLED | ENABLED | ENABLED | REGULATOR ON | NORMAL INDUCTIVE CHARGE STATE OR EXTERNAL $X_V$ USB POWER APPLIED |
| $X_V$ | $V_{IC}+$ | $Y_V$ | $T_V$ | DISALLOW $V_{IC}$ POWER OUT | ENABLED | ENABLED | REGULATOR ON | BOTH INDUCTIVE CHARGER AND CONDUCTIVE CHARGER TRANSMITTERS APPLIED OR EXTERNAL $X_V$ USB POWER APPLIED SHUT DOWN IC POWER SINCE CONDUCTIVE POWER AVAILABLE |

FIG. 9

DEVICE FOR WIRELESS CHARGING HAVING A PLURALITY OF WIRELESS CHARGING PROTOCOLS

FIELD OF THE INVENTION

The present invention generally relates to wireless charging systems, and more particularly relates to a device sleeve adapted to receive a plurality of wireless protocols.

BACKGROUND OF THE INVENTION

Portable battery operated electronic devices, such as cell phones, employ rechargeable batteries that must be recharged as battery charge is consumed. Typically, charging of electronic devices involves physical connection to an electrical charger via a wire connection. More recently, wireless charging devices such as inductive, magnetic resonance, and conductive pad chargers are available to charge the battery without any physical wire connection between the electronic device and the charging device. Inductive or magnetic resonance wireless chargers generate an electromagnetic field through the use of electromagnetic transducers to transfer the electric energy from the charging device to a receiver on a battery or device managing battery charging. Conductive pad chargers use a DC contact pin system.

Wireless charging systems in consumer, mobile, and automotive environments may use different standards and technologies to enable wireless charging of electronic devices. Such charging systems typically include a device sleeve adapted to attach to a chargeable device and designed for one wireless protocol. However, a particular sleeve designed for only one wireless protocol may be inconvenient for consumers that need to charge their devices in a multitude of locations which provide charging stations enabled with wireless protocols different than that designed for the particular sleeve. For example, a wireless charging region of a particular vehicle may be configured with a conductive charging protocol while a wireless charging system at an airport restaurant may be configured with an inductive charging protocol. Thus, customers that have sleeves configured for conductive charging in a vehicle will not be able to take advantage of inductive charging regions available outside the vehicle without needing to purchase and carry a separate sleeve enabled with an inductive charging protocol. It is therefore desirable to provide a sleeve that allows the customer to charge their device easily and effectively whether the sleeve is receiving inductive or conductive power from a wireless charging surface.

SUMMARY OF THE INVENTION

According to one aspect of the present invention, a receiver device is configured to charge a chargeable device, including an inductive region having at least one receiver coil capable of receiving magnetic flux from an inductive charging system. Additionally the receiver device includes a conductive region having contacts for receiving wireless electric power from a conductive charging system. The receiver device further includes a connector for transferring the wireless power received from the wireless or conductive charging system to the chargeable device to charge the chargeable device.

According to another aspect of the present invention, a sleeve configured to charge a chargeable device is provided. The sleeve includes an inductive region for receiving wireless electric power from an inductive charging system and a conductive region including contacts for receiving wireless electric power from a conductive charging system. The sleeve further includes a connector for transferring the wireless power received from the wireless or conductive charging system to the chargeable device to charge the chargeable device.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2 is a front perspective view illustrating the locations of the inductive and conductive regions of the receiver sleeve relative to the chargeable device;

FIG. 3 is a back perspective view of a receiver sleeve used for connecting wireless power from the receiver sleeve to the chargeable device;

FIG. 4 is a front view of the receiver sleeve with hidden features shown in phantom, according to an exemplary embodiment;

FIG. 5 is a cross section view taken through line V-V of FIG. 4 further illustrating the receiver sleeve;

FIG. 8 is a logic table showing mapping of the location of the contact pins to a particular schematic of the isolation diode array including the example schematics in FIGS. 7B-7E;

FIG. 9 is a logic table showing mapping of the charging state of the receiver sleeve and other components based upon detected input state;

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
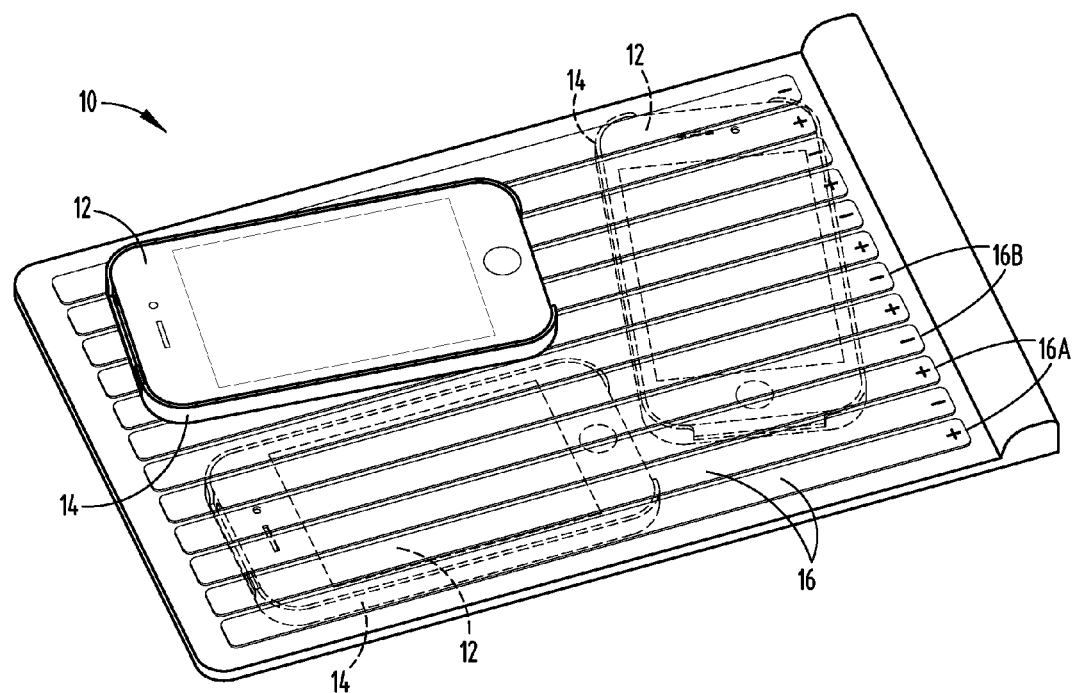
FIG. 1 is a perspective view of a conductive pad wireless charging system with a chargeable device connected to a receiver sleeve device placed upon the system.

Referring to FIG. 1, a wire-free or wireless charging system 10 is illustrated for charging one chargeable device(s) 12 each having a receiver device shown in the form of a sleeve 14 according to one embodiment. The charging system 10 receives electric power from an external power source (not shown). The charging system 10 transfers electric power wirelessly to the chargeable device 12 when the device 12 is connected to the receiver sleeve 14 thereby enabling the device 12 to be charged when the device 12 is placed on the contact surface (e.g., pad) of the charging system 10. The system 10 includes an array of conductors 16 provided to make electrical contact with conductive charging pins 20 on the bottom of the receiver sleeve 14, according to one embodiment. The charging system 10, as shown in FIG. 1, may have a surface arrangement having alternating positive 16A and negative 16B contact strips. An adequate number of charging pins 20 on the receiver 14 of device 12 is needed to ensure at least one charging pin 20 has an electrical connection with a positively charged strip 16A and at least one charging pin 20 has a second contact having an electrical connection with a negatively charged or common ground strip 16B, thereby providing electrical power to be transferred conductively from system 10 into the device 12. In the charging system shown, the voltage on the conductive system 10 is fixed and independent of the type of device 12 placed on its surface such that each device 12 with receiver sleeve 14 placed on the surface is responsible for obtaining power from the surface and regulating it to a different lower voltage for its own independent use. Therefore, the system is configured for a plurality of devices with differing charging rates and constraints to be adequately charged on the same charging system.

While FIG. 1 illustrates an exemplary embodiment of the wireless charging system 10 used for transferring electrical power conductively, the receiver sleeve 14 is also configured to wirelessly charge device 12 inductively (as will be explained in detail below) and therefore it should be appreciated that charging system 10 is not limited to only the conductive configuration that is shown in FIG. 1, but may also be implemented with circuitry that uses one or more transmitter coils on the system 10 to provide a magnetic field to one or more receiver coils of sleeve 14 in order to charge the device 14 inductively.

Figure 1A:
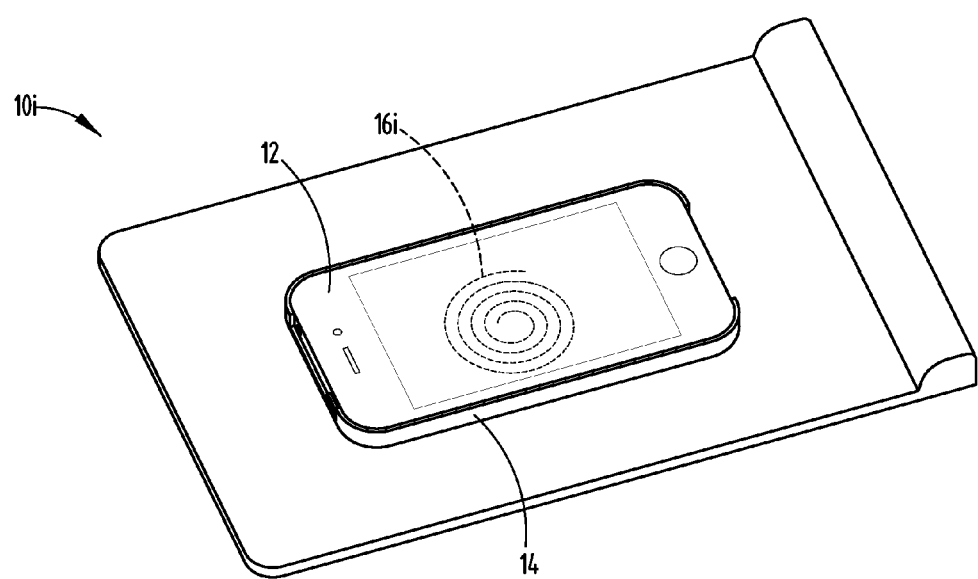
FIG. 1A is a perspective view of an inductive wireless charging system with a chargeable device connected to the receiver sleeve device placed upon the system.

One example of a wire-free or wireless inductive charging system 10i is illustrated in FIG. 1A showing a device 12 with the receiver sleeve 14 resting on a pad for inductive charging purposes. The inductive charging system 10i includes one or more transmitter coils 16i for providing a magnetic field which, in turn, is received by one or more receiver coils provided in the receiver sleeve 14 as described herein. It should further be appreciated that the wireless conductive charging system and wireless inductive charging systems could be integrated into a single wireless charging pad, such as one having separate inductive and conductive charging regions, according to other embodiments.

FIG. 2 illustrates the receiver sleeve 14 and chargeable device 12. The receiver sleeve 14 includes embedded magnetic terminals 22, a center inductive coil region 24, and a plurality of conductive contact pins 20 arranged in a specific configuration near the edge or periphery of the sleeve 14. The chargeable device 12 of FIG. 2 may be charged by placing the sleeve 14 substantially on the device 12 thereby enabling device 12 to be charged by either inductive or conductive means and positioning the connected chargeable device on system 10 as described in FIG. 1 or an inductive charging 10i such as is shown in FIG. 1A. The sleeve 14 may be made from gel, silicon or a shell type housing as shown in FIG. 2 which is mounted on the device 12. The device may be a mobile phone as shown or other devices generally requiring less than 5-15 watts (e.g., cameras, handheld video games, MP3 players, etc.). Mounting the receiver sleeve 14 via a connector port embedded into the sleeve that may be connected to the charging terminal of the device onto device 12 allows conductive or inductive wireless power technology to be routed directly to the input power pin when the device 12 with mounted receiver sleeve 14 is placed onto a conductive wireless charging system 10 or inductive wireless charging system 10i.

FIG. 3 illustrates the receiver sleeve 14 having a plurality of contact pins 20 arranged in a specific configuration near the edge of the sleeve 14 that will ensure wireless power transfer independent of orientation of device 12 placed on system 10 (mathematics will be explained in more detail with reference to FIG. 10). As shown in the example in FIG. 3, there are six contact pins in the configuration.

FIG. 4 illustrates an embodiment of the power receiver sleeve 14 with both conductive and inductive wireless power delivery. In the embodiment shown, the receiver sleeve 14 may be implemented with a housing having a plurality of regions including a receiver coil region 24 for inductive charging, a conductive power region containing conductive contact points 20, magnet regions 22 providing sufficient magnetism with the contact strips, and a clear region 25 for non-obscuring a camera and/or lamp portion of chargeable device 12. It should be appreciated that the exact implementation of the receiver sleeve housing will vary depending on the specific device 12 being charged.

Receiver coil region 24 provides at least one coil 27 formed on the receiver sleeve 14, while corresponding one or more electromagnetic transmitting coils may be provided in an inductive charging system 10i. The coils and sleeve 14 transfer power inductively to one or more chargeable devices 12 positioned on or near the transmitting coil. The transmitting coil of an inductive charging system may then charge the inductive coil of the receiver via electromagnetic induction by generating a magnetic flux. In this inductive wireless charging method, the transmitting and receiving coils are aligned approximately parallel and concentric to each other for maximum charging efficiency. A magnetic coupling is established between chargeable device 12 and wireless charging system 10i such that energy received from the transmitter coil of system 10i by the receiver sleeve 14 may then be rectified and regulated to a suitable DC voltage (e.g., 5 volts) to charge the rechargeable battery of the chargeable device 12.

Conductive power regions 26A-26B, as shown in FIG. 4, include six contacts shown as contact pins 20, three on each side of the inductive charging region 24. The contact pins 20 may be a plurality of connector formats/designs to conductively receive electric power from the wireless charging system such as zero insert force (ZIF) connector pins. As will be explained in more detail below with respect to the circuitry of the receiver sleeve 14 for wireless power transfer in FIG. 6, the voltage $Z_V$ received at a particular pin is reduced by the sleeve 14 to deliver a reduced voltage output $X_V$ to sufficiently charge the battery of the chargeable device 12 without risking damage to the receiver electronics or the battery of the device 12. The predetermined voltage reduction level $X_V$ may be 5 volts, according to one embodiment, which is a standard amount that the voltage to the battery of device 12 should not rise above during charging of the device 12.

FIG. 4 further illustrates magnets 22A-22D which provide sufficient magnetism between pins 20 on receiver sleeve 14 and the contact strips 16 on the conductive charging system 10. Providing sufficient magnetism is especially useful in charging environments such as an automobile where a device 12 positioned upon the charging system 10 could be more susceptible to movement or falling off the charging system 10. Magnets 22A and 22B located on the long axis of sleeve 14 provide most of the contact force to sufficiently steady chargeable device 12 on charging system 10 while the magnets 22C-22D on the short axis of sleeve 14 provide the additional force needed to stabilize device 12, thereby preventing the device 12 from moving or falling off charging system 10. The magnets 22A-22D are positioned outside and away from the coupling zone of the low frequency inductive receiver and transmitter coils, thereby preventing interference of inductive energy transfer caused by placing magnets in the path the transmitter and receiver coil pair.

The power receiver sleeve 14 with both conductive and inductive wireless power delivery also contains a plurality of shielding areas designed to prevent magnetic flux of the receiver coil region 27 from leaking into the chargeable device 12 which may substantially alter the operation of the other components of the sleeve 14 and/or charging system 10. The shielding may be applied to the inside surface of the sleeve 14 and/or molded into the sleeve 14 so that the shield is substantially between any printed circuit board (PCB) circuitry embedded in the sleeve 14 and transmitter coils of an inductive charging system.

Sleeve 14 may also include a clear or cut out area 25 in order to provide an aperture and non-obstruction for a device camera and/or allow optimum performance of device antennas that may exist in such areas on certain devices. It should be noted that the location of the device antennas may vary depending on the device being charged and/or manufacturer of the device. The location and size of a clear or cut out area 25 of sleeve 14 may be customized for a specific device and/or manufacturer.

FIG. 5 shows a cross-sectional view of the receiver sleeve 14 with device 12 inserted inside. The shielding layer 28 is shown below the device 12 and in proximity to and/or below receiver coil layer 24. The shielding layer 28 may be a double layer shielding configuration having both a layer of magnetic material and a layer of conductive material for providing a sufficient degree of shielding.

Figure 6:
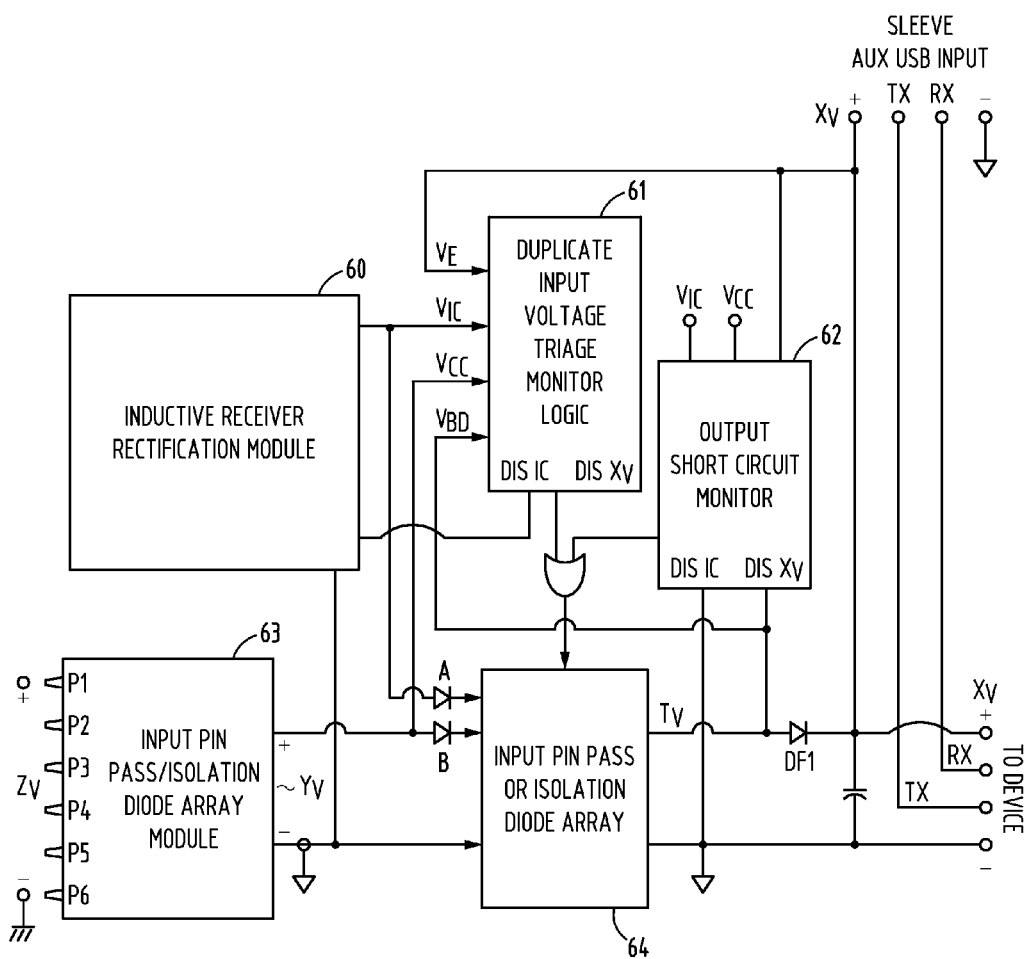
FIG. 6 is a functional block diagram/circuit of the receiver sleeve for wireless power transfer from the charging system to the chargeable device.

FIG. 6 shows the circuitry of the wireless charging receiver sleeve 14 further including an input pin pass/isolation diode array module 63, inductive receiver rectification module 60, duplicate input voltage triage monitor logic 61, output short circuit monitor 62 and switch-mode step-down regulator 64. In the embodiment shown, each of the aforementioned modules may be controlled by one or more processors and the circuitry is part of the sleeve 14 connected to the device 12. As shown in FIG. 6, a plurality of external power sources may be applied to the receiver sleeve 14 at a particular time including: 1) a wireless inductively coupled energy applied by an inductively charged system 10i (e.g., Powermat® and/or Qi® enabled technology) to the receiver coils 27 of receiver region 24 and managed and processed by inductive charging software algorithms processed by a microcontroller within module 60 wherein the rectification module 60 is configured to generate an output voltage $V_{IC}$ from said magnetic flux received by the inductive charging system; 2) voltage from a conductive charging system (e.g., Wildcharge® enabled charging system) applied to the conductive charging inputs P1-P6 of input pin pass/isolation diode array module 63 with $Z_V$, wherein $Z_V$ may be 15 volts; and 3) $X_V$ input applied to the auxiliary USB input female connector for the purpose of conventional wired charging, wherein $X_V$ may be 5 volts. Thus, the receiver sleeve 14 is configured to receive inductive supplied power and conductive supplied power from different types of power supply sources and supplies the electric power to charge one or more charger devices 12 having different wireless charging protocols.

With the exception of electric power containing $X_V$ voltage applied to the USB input female connector which is directly passed through to the device battery, the other three possible sources of power are fed to the input of the switch-mode voltage step-down regulator module 64. The voltage $V_{IC}$ collected from the inductive receiver rectification module 60 is presented to module 64 for voltage regulation down to voltage $X_V$ in order to charge the device 12 without damaging the battery of the device 12 under charge. Similarly, the voltage, $V_{CC}$ collected from the output of the conductive charging input pin pass/diode array module 63 is also presented to module 64 for regulation down to voltage $X_V$. The switch-mode regulator 64 may accept power from either the output of the input pin pass/isolation diode array module 63 (conductive charging receiver) or the inductive charging receiver 60 and diodes A and B, in series from the inductive and conductive power source, respectively, are positioned to prevent one power source from sinking current into the other power source when the other source is inactive.

Figure 7:
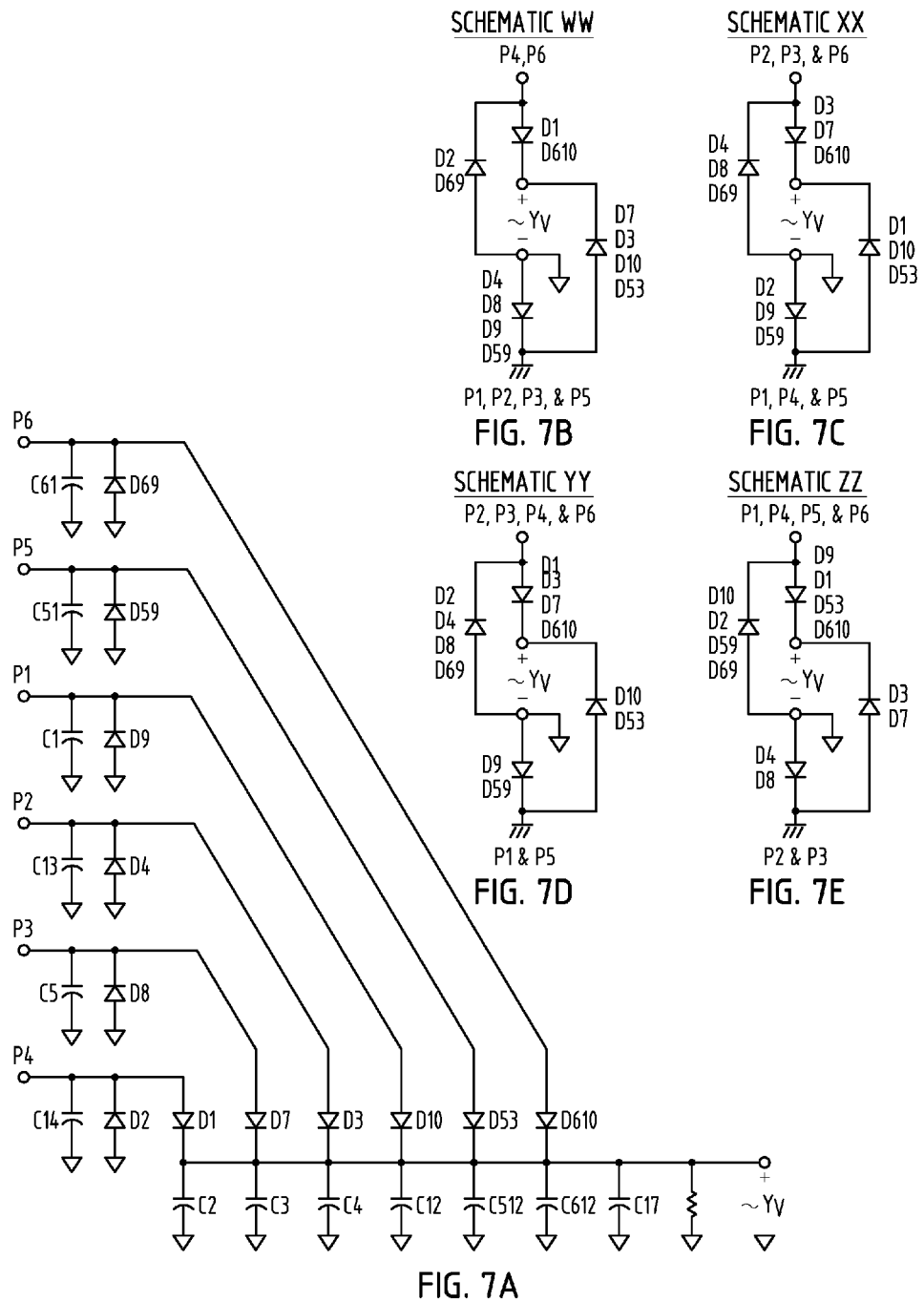
FIG. 7A is a schematic circuit diagram of the isolation diode array of the receiver sleeve.
FIGS. 7B-7E are simplified equivalent circuit schematic diagrams of the isolation diode array based upon the location of the contact pins on the wireless system.

FIG. 7A illustrates the pre-processing circuitry of the input pin pass/isolation diode array module wherein diodes may be forward or reverse biased allowing current to be passed or isolated (i.e., blocked) in the six pin receiver input configuration such that two or more of the input pins P1-P6 always make contact with the contact strips of charging system 10 such that one or more pins make contact with a negative strip 16B (e.g., GND) and one or more pins make contact with a positive strip 16A (e.g., 15V). Since the possibility exists that only one of the six pins may be ground (GND) and only one pin may be at a voltage potential of 15V, there exists the possibility that four of the six pins may also be open circuit such that neither are in contact with the negative strip 16B or the positive strip 16A. As each of the six pins could be GND, 15V or open circuit, this creates $3^6$ or 729 possible states, according to one example, that exist when the six-pin receiver sleeve is placed on the surface of the conductive charging system.

As illustrated in FIGS. 7B-7E, schematics WW, XX, YY and ZZ illustrate example states where the six input pins P1-P6 are placed in contact with different lines on the charging system 10. As shown, in each of the example states, the circuitry of the input pin pass/isolation diode array module will provide around Y volts to the receiver of the regulator module provided that two of the six input pins P1-P6 fall on either GND or Z volts. However, in the examples of FIGS. 7B-7E it is assumed all pins fall on GND or Z volts. It should be noted that when Z is 15V along any of the six input pins, the input pin pass/isolation diode will assure a Y voltage of 13.6 volts to be sent to the switch mode regulator. For example, as shown in schematic for WW in FIG. 7B if P4 and P6 are 15 V while the rest of the pins are GND, the voltage at Y is calculated as $(V_4+V_6)_{avg} - V_{(D2+D69)avg} - V_{(D1+D610)avg} = (15)-(0.7)-(0.7)=13.6$ V. Therefore, the input pin pass/isolation diode array module 63 ensures that regardless of what potential is applied to any input pin P1-P6; a) a positive voltage will be presented to the battery voltage regulator 64; b) there generally is never a path within the receiver circuit 14 that may result in a short circuit at the output of module 63; and c) any negative voltage received by an input pin generally presents no risk of damage to the receiver electronics or the battery of the device.

FIG. 8 is a logic table illustrating example six pin input voltage states of either Z or GND (open pin states not shown) and their resultant voltage schematics depending on the input state which correspond to the schematics illustrated in FIGS. 7B-7E. As will be explained in further detail with respect to FIG. 11, certain input states will not be possible due to the locations of input receiver pins P1-P6 relative to the locations of the charging strips 16 on charging system 10 which ensures at least one positive contact and one negative contact will be made, thus always providing power from the charging system 10 to the chargeable device 12.

The inductive charging sleeve of FIG. 6 accounts for situations where any combination of inductive power source (from input pin pass/isolation diode array module 63), conductive power source (from the inductive receiver rectification module 60), $X_V$ power applied to the auxiliary USB input female connector of sleeve 14 for the purpose of wired charging may be present. For example, when a chargeable device 12 is placed on charging system 10, it is possible that both the inductive module 60 and the conductive module 63 may both be collecting power and presenting the power as an input to the step-down regulator 64. Additionally, since users that need to charge their mobile electronic devices may not find themselves in proximity to a conductive or inductive wireless charging pad, it may sometimes be necessary to charge device 12 connected to the sleeve 14 through a conventional wire means such as a micro-B USB connection. Given the possibility of a plurality of power sources that may be fed into the step down regulator, the sleeve 14 includes a duplicate input voltage triage monitor logic circuit 61 to ensure that the regulator 64 is not over fed and also to ensure that the battery voltage does not rise above voltage $T_V$, wherein $T_V$ may be 5V to ensure the device battery is not overcharged. The logic of duplicate input voltage triage monitor logic circuit 61 performs actions to prevent the regulator 64 from being over fed depending on which power sources are detected as present by module 61.

FIG. 9 describes some of the statuses of the regulator output and other components of the sleeve 14 based upon the power source inputs detected by the triage monitor logic. For example, as shown in row 7 of FIG. 9, if module 61 detects that inductive power source module 60, conductive power source module 63 are delivering power to the regulator 64 and the voltage at the output of the regulator is detected as not an open circuit and no USB input $X_V$ is detected (i.e. both $V_{IC}$, $V_{CC}$ inputs are detected as active, $V_E$ is detected as non-active and $T_V$ is detected instead of 0.7 volts implying that the regulator is operating as expected), the regulator 64 stays ON, the status of the SC-DIS $X_V$ Line and DIS $X_V$ are enabled (meaning disabling both input signals from inhibiting the regulator) and module 60 is turned off since conductive power from module 63 is detected. It is desirable to turn off the inductive module 60 when both inductive and conductive systems are both delivering wireless energy because there is no adequate means to communicate back to the conductive module 63 ceasing providing $Z_V$ power while there is a means via DIS IC in triage logic 61, and conductive power transfer is more efficient than inductive.

In another example state, as shown in row 8 of FIG. 9, in correspondence to the circuitry of sleeve 14 in FIG. 6, it is desirable for module 61 to monitor and disable the switch mode regulator 64 when external USB power $X_V$ is detected at the battery of chargeable device 12 (i.e., $V_E$ signal is detected as active by triage monitor 61 prior to inductive ($V_{IC}$) or conductive ($V_{CC}$) sources being detected as activated). In such a case, when $V_{IC}$ and $V_{CC}$ are detected as 0 volts and $V_{BD}$ is detected as 0.7 volts by module 61 while $V_E$ is detected as $X_V$, the regulator 64 will not be activated due to inductive module 60 and conductive module 63 not sending any input to Regulator 64, thereby allowing external $X_V$ USB power to be applied directly to the device battery.

In other example states, if diode DF1 in FIG. 6 is an open circuit as shown in rows 3, 5 and 7, of FIG. 9, then independent of whether $V_{IC}$ or $V_{CC}$ is detected as on (rows 3 and 5) or if they are both detected as on (row 7), $V_E$ will be 0 volts and $V_{BA}$ will be $T_V$ which is typically, 5.7 volts due to diode DF1 being open circuit. It should be noted that diode DF1 is placed in the sleeve configuration to ensure that $X_V$ (e.g. 5 volts) from an external source (e.g., USB input) does not sink or load the output of the switch mode regular when it is inactive. During regular sleeve 14 operation where no external DC power source is received by the device 12, the switch mode regular output would be one diode drop above $X_V$ (e.g., $X_V$+0.7 volts or 5.7 volts if $X_V$=5 volts) to ensure voltage being used to charge the device was $X_V$.

The output short circuit monitor circuit 62 of FIG. 6 may monitor both external USB female connector $X_V$ terminal and the anode of diode DF1. If monitor circuit 62 detects the anode of DF1 at approximately 0.7 volts above common and the battery voltage is approximately around 0 volts, but either the inductive or conductive power sources are active, it would then classify this state as a short circuit and disable the switch-mode regulator 64 (i.e., shut off the regulator). The sleeve 14 would then shut off the individual modules and reset itself after removal of the short circuit. This operation state is shown in rows 2, 4 and 6 of FIG. 9.

Figure 10:
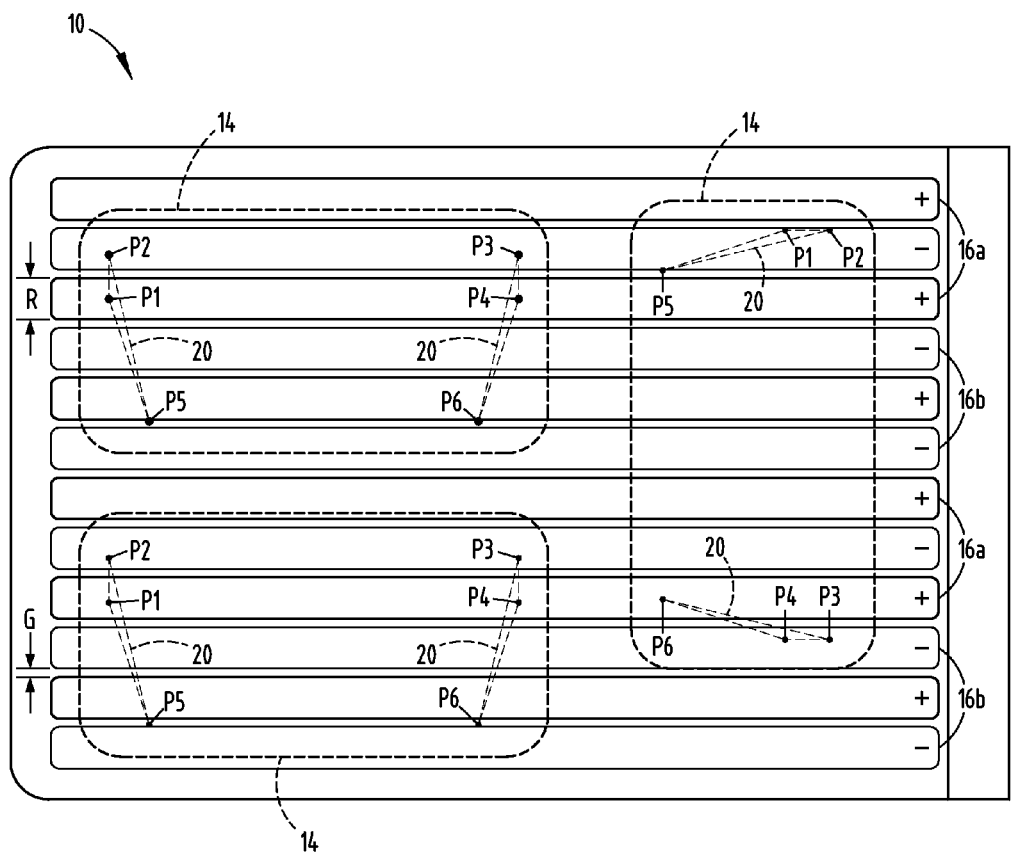
FIG. 10 is a top view of the conductive pad wireless charging system of FIG. 1, illustrating several chargeable devices with receiver sleeves on the charging system.
Figure 11A:
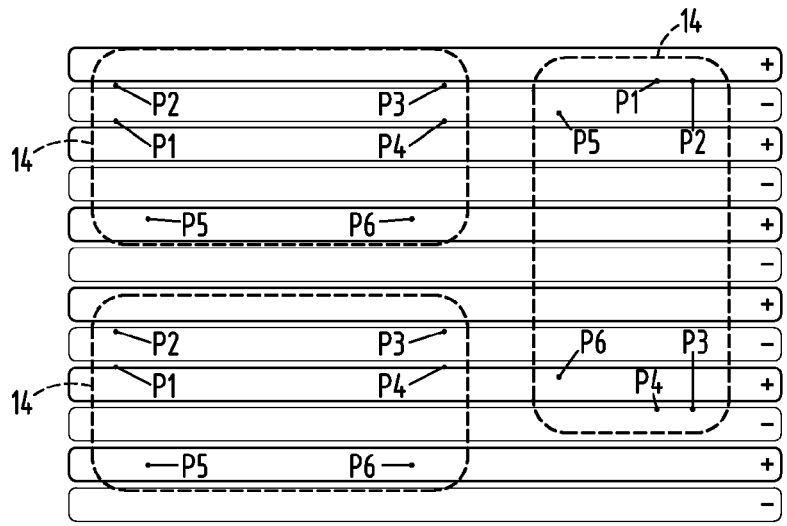
FIGS. 11A-11F are top views of the charging system of FIG. 1, illustrating a plurality of arrangements of chargeable devices with receiver sleeves on the charging system.
Figure 11B:
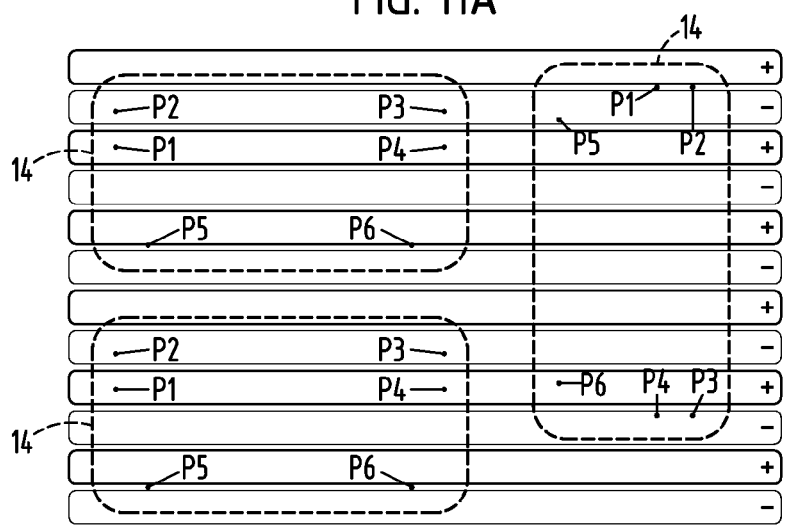
Figure 11C:
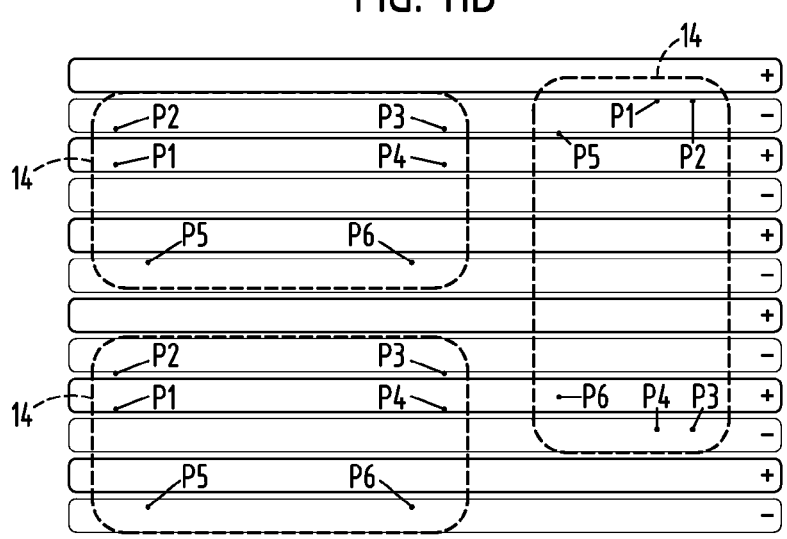
Figure 11D:
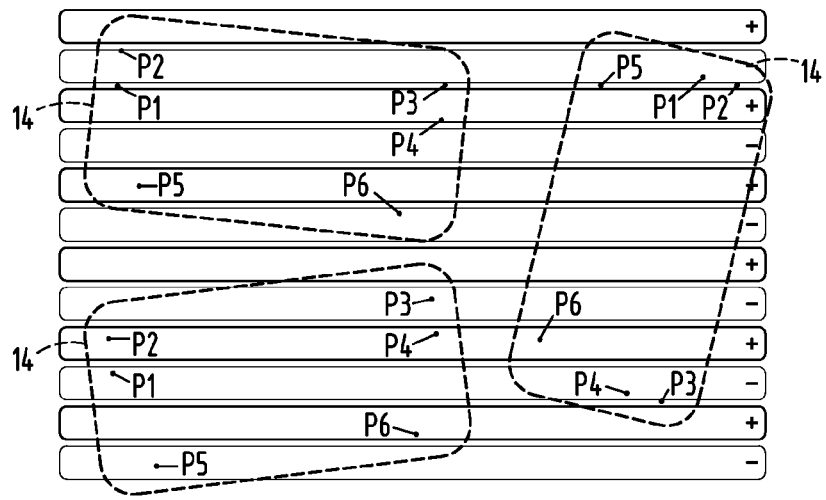
Figure 11E:
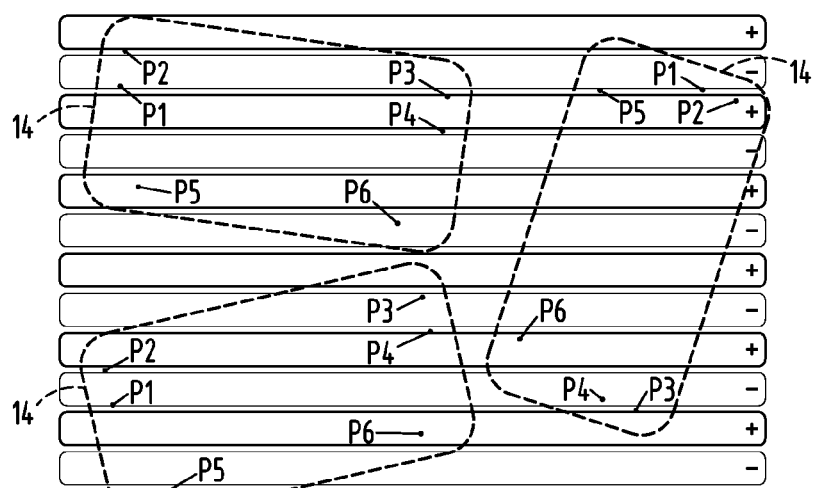
Figure 11F:
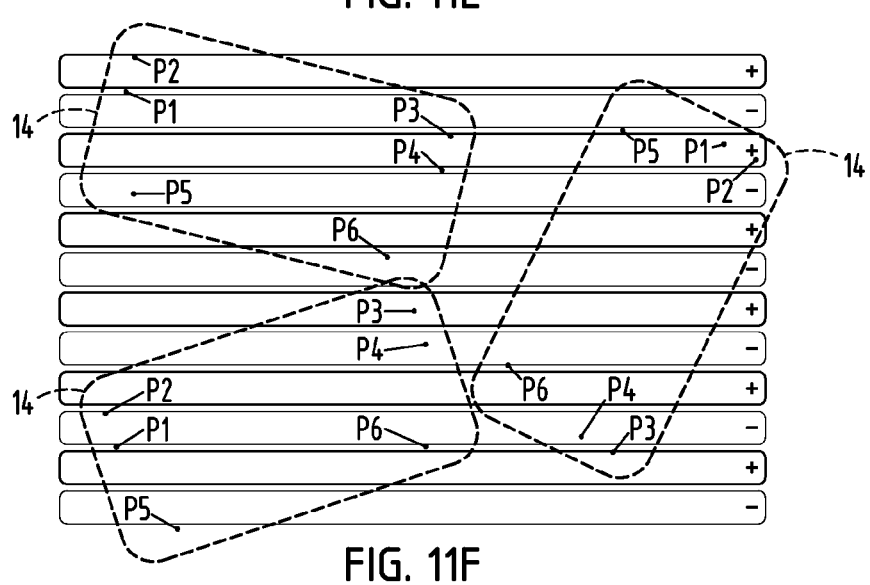

FIG. 10 shows a pattern of pins 20 on the outer portion of the sleeve 14 in conductive region 26A-B with the six pins arranged such that pins P2 and P3 are located as vertices of an imaginary equilateral triangle, two of the contact pins P1 and P4 are located as the center of the equilateral triangle configuration and two contact pins P5 and P6 derived from a predetermined vector distance from the vertices (P2 or P3) or center locations (P1 or P4) of the contact points. It should be noted that the charging system 10 may have a plurality of charging strips 16 of width R with a lane gap of G (non-charging strips). The location of P5 and P6 in relation to the charging system 10 and the other pins can be derived by moving a vertical distance of a predetermined width R and a predetermined gap G. For example, the location of P5 can be derived by shifting the location of P1 a predetermined amount in the horizontal direction and then shifting the location downwards in a predetermined factor of R and G. The pattern and locations of the contact pins P1-P6 on sleeve 14 and contract strips 16 on charging system 10 form a geometrically balanced function wherein power is transferred conductively from the system 10 to the chargeable device 14 without regard to position and orientation of the device 14 placed on the system 10. The spacing of these pins away from the inductive receiving coil zone 24 in the device 14 allows the same device 14 to be placed on an inductive charger pad with the same device 14 to simultaneously achieve the goal of mitigating potential interference between the metal makeup of the pins P1-P6 and the coupling zone 24 for inductively charging the receiver coil 27. The out-board spacing of the pins P1-P6 was designed such that it does not obstruct areas where a device camera or illumination lamp may be located, and to provide greater stability of the sleeve 14 on a charging surface due to location of the pins near the peripheral of the sleeve.

FIGS. 11A-11F illustrate a plurality of positions and orientations that sleeve 14 may take when placed on charging system 10. FIGS. 11A-11F show that independent of the orientation and positions of pins P1-P6 on sleeve 14, at least one positive (e.g., 15 volts) and one negative contact (GND) will be always made when the sleeve 14 is placed on the pad, thereby guaranteeing that wireless power to be transferred from the system 10 to device 12 with this new pin geometry presented in this application.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A receiver device configured to charge a chargeable device, comprising:
    an inductive region comprising a receiver coil for receiving magnetic flux from an inductive charging system; and
    a conductive region comprising a first and a second plurality of contacts, the first and second plurality of contacts configured for receiving wireless electric power from a conductive charging system, wherein the first and second plurality of contacts are positioned on opposite sides of the inductive region and wherein an asymmetry in the number of contacts on a surface exists across a lengthwise centerline of the chargeable device.

2. The receiver device of claim 1 further comprising:
   a connector for transferring the wireless power received from the inductive or conductive charging system to the chargeable device to charge the chargeable device.

3. The receiver device of claim 1 further comprising:
   a voltage regulator for regulating an amount of power transferred from the receiver device to the chargeable device.

4. The receiver device of claim 3 further comprising:
   a diode at the output of the voltage regulator to prevent reverse current flow.

5. The receiver device of claim 1, wherein the first and second plurality of contacts are positioned proximate opposite ends of the receiver device.

6. The receiver device of claim 1, wherein the contacts are connectorless.

7. The receiver device of claim 1, wherein the first plurality of contacts includes at least three contacts.

8. The receiver device of claim 1, wherein the first plurality of contacts forms a scalene triangle.

9. The receiver device of claim 1 further comprising:
   a plurality of magnets to increase force applied by the contacts to a surface of the conductive or inductive charging system.

10. The receiver device of claim 9, wherein the magnets are located substantially in close proximity to the perimeter of the receiver device and away from the receiver coil.

11. The receiver device of claim 1, further comprising:
    circuitry capable of converting output power of an inductive or conductive wireless charging system to a standard power level or range required to charge the chargeable device.

12. The receiver device of claim 1, wherein the contacts are configured in a non-equilateral pattern in order to ensure charging of the chargeable device independent of orientation and location of the chargeable device in relation to the conductive charging system.

13. The receiver device of claim 1 further comprising:
    an inductive rectification module configured to generate an output voltage based upon said magnetic flux received by the inductive charging system.

14. The receiver device of claim 13, wherein the inductive rectification module sends the output voltage to a voltage regulator for regulating the amount of power transferred to the chargeable device.

15. The receiver device of claim 1, wherein the contacts protrude from the receiver device.

16. The receiver device of claim 1, further comprising:
    a case formed to substantially fit and attach onto the chargeable device.

17. The receiver device of claim 1 further comprising:
    circuitry to ensure charging of the chargeable device is independent of orientation and location of the chargeable device in relation to the conductive charging system.

18. The receiver device of claim 17, wherein the circuitry includes a module which is capable of converting output power received by the contacts from the conductive wireless charging system to a predetermined power level.

19. A sleeve configured to charge a chargeable device, comprising:
    an inductive region for receiving wireless electric power; and
    a conductive region comprising a first and a second plurality of contacts for receiving power from a conductive charging system, wherein the first and second plurality of contacts are positioned proximate opposite ends of the chargeable device and wherein an asymmetry in the number of contacts on a surface exists across a lengthwise centerline of the chargeable device.

20. The sleeve of claim 19, wherein the inductive region comprises at least one receiver coil receiving magnetic flux from an inductive charging system.

* * * * *